United States Patent [19]

Lawton

[11] 4,250,275

[45] Feb. 10, 1981

[54] REINFORCED ACRYLIC FIBER AND METHOD FOR MAKING THE SAME

[75] Inventor: Ernest L. Lawton, Durham, N.C.

[73] Assignee: Monsanto Company, St. Louis, Mo.

[21] Appl. No.: 62,864

[22] Filed: Aug. 1, 1979

[51] Int. Cl.³ .................................................. C08L 75/02
[52] U.S. Cl. .................................... 525/128; 525/123; 525/131
[58] Field of Search ..................... 525/128, 131, 123; 528/68

[56] References Cited

U.S. PATENT DOCUMENTS

| | | | |
|---|---|---|---|
| 3,038,876 | 6/1962 | Farago | 525/131 |
| 3,419,534 | 12/1968 | Goodman | 525/123 |
| 3,646,178 | 2/1972 | Traubel | 525/128 |
| 4,086,207 | 4/1978 | Cassandrini | 525/128 |
| 4,093,674 | 6/1978 | Tsutsui | 525/128 |

Primary Examiner—Paul Lieberman
Attorney, Agent, or Firm—Robert L. Broad, Jr.

[57] ABSTRACT

A reinforced acrylic fiber and the method for making the same wherein a diamine selected from the group consisting of ethylene diamine, piperazine, and hexamethylene diamine is reacted with a diisocyanate selected from the group consisting of:

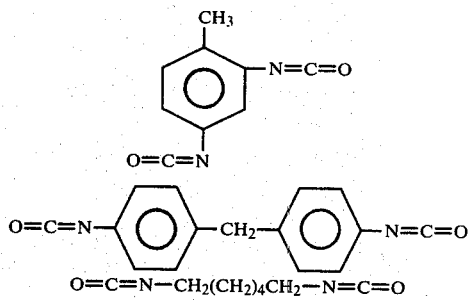

in the presence of a spinning dope made up of dimethylacetamide containing 10 to 30 weight percent of acrylic polymer dissolved therein. This reaction forms a polyurea which is present in discrete particles in the spinning dope. The spinning dope containing the polyurea is extruded to form fibers which have good hot-wet properties.

2 Claims, No Drawings

REINFORCED ACRYLIC FIBER AND METHOD FOR MAKING THE SAME

BACKGROUND OF THE INVENTION

1. Field of the Invention

This invention relates to improved acrylic fibers and the method of making the same.

2. Description of the Prior Art

It is well known that conventional acrylic fibers have generally poor hot-wet performance. Symptoms of these poor hot-wet properties are low resistance to deformation, high elongation or creep, and small restoring forces after deformation. Under certain dyeing conditions, the fibers become distorted and thus yield fabrics with an undesirable appearance.

SUMMARY OF THE INVENTION

Acrylic fibers and the method for making the same wherein a diamine selected from the group consisting of ethylene diamine, piperazine, and hexamethylene diamine is reacted with a diisocyanate selected from the group consisting of:

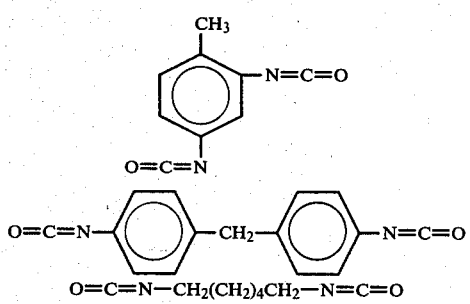

in the presence of a spinning dope made up of dimethylacetamide having dissolved therein 10 to 30 weight percent of acrylic polymer. This reaction forms a polyurea which is in the form of discrete particles in the spinning dope. The dope containing the polyurea is then spun to form acrylic fibers which have good hot-wet properties.

DETAILED DESCRIPTION OF THE INVENTION

In the process of this invention, polyureas are synthesized in a spinning dope made up of dimethylacetamide containing a dissolved acrylic polymer. The following equations illustrate the reaction:

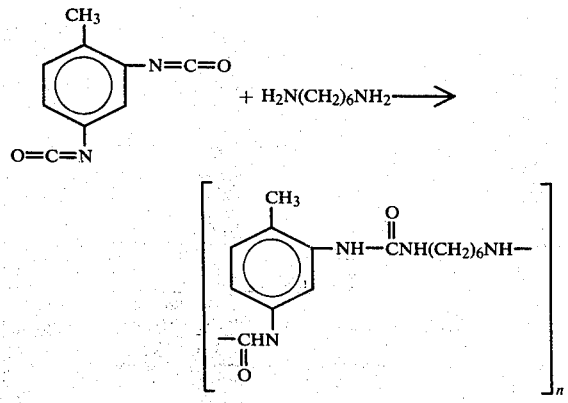

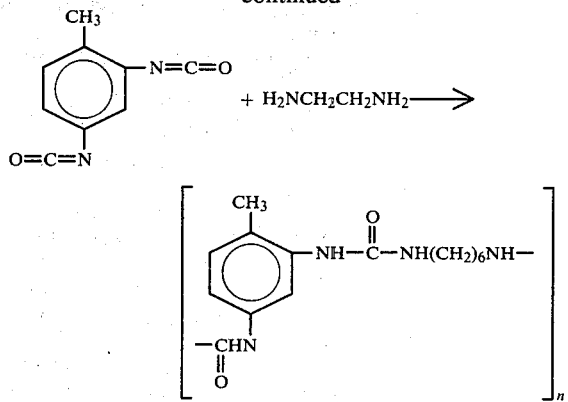

where n is 4 to 300.

The polyurea formed is in the form of a discrete phase in the polymer solution, the polyurea appearing to be present as particulates with a mean longest dimension of about 1 micron or less, dispersed throughout the spinning solution. The spinning solution containing the polyurea is spun into fibers under conventional conditions. Toluene diisocyanate, diphenyl methane diisocyanate or hexane diisocyanate may be used with a diamine such as ethylene diamine, piperazine or hexamethylene diamine. Toluene diisocyanate is preferred.

The spinning solution is made up of a conventional fiber-forming acrylic polymer dissolved in a suitable solvent, such as dimethylacetamide of dimethylformamide. Dimethylacetamide is preferred. The polymer is made up of at least 35% acrylonitrile with other monoolefinic monomers copolymerized with the acrylonitrile and, is preferably, made up of at least 85 weight percent acrylonitrile.

The diisocyanate and the diamine polymerize in situ in the spinning dope to form the polymer which enhances the hot-wet properties of fibers formed from the dope, without adversely affecting other properties of the fibers. The spun fibers will contain 5 to 40 weight percent of the polyurea and will preferably contain 5 to 20 weight percent.

EXAMPLE

The reactions described herein were conducted in a 1 liter resin kettle equipped with a mechanical stirrer and blanketed with a nitrogen atmosphere. The stirrer used was a stainless steel pitch blade turbine type, operated at 350 rpm.

A polymer of about 93% acrylonitrile and about 7% vinyl acetate was dried overnight at 55° C. under 0.1 mm Hg pressure. The dried polymer, 18.32 g, was dissolved in 164.9 g of dried dimethyl acetamide by heating it to 55° C. under a nitrogen blanket to form a spinning solution or dope. The dope was then cooled to room temperature.

The required quantity of the diamine was dissolved in the spinning solution and the stoichiometric quantity of the diisocyanate was added to the dope with stirring. The dope became opaque within about 30 seconds after addition of the diisocyanate and stirring was continued for 30 minutes. Varying amounts of the diamine and diisocyanate were added to the spinning solution to give percentages of polyurea based upon total polymer weight in the spinning solution and assuming 100% conversion, while holding the acrylic polymer concentration in the solution constant at about 10 weight percent, based on the total spinning solution weight prior to addition of the diamine.

Portions of the polyurea-containing spinning solutions were formed into films and the dynamic storage modulus was determined under both dry and wet conditions using a Vibron dynamic mechanical analyzer. Table 1 shows storage moduli for acrylic films containing varying amounts of the polyurea made from toluene diisocyanate (TDI) and hexamethylene diamine (HMD). Table 2 shows storage modulus of acrylic films containing varying amounts of the polyurea formed from diphenyl methane diisocyanate (MDI) and hexamethylene diamine. Run A of Table 1 and Run H of Table 2 show the modulus for acrylic films containing no polyurea. These tables show that the storage modulus of the acrylic film is significantly improved at higher temperatures and especially at hot-wet conditions. Table 3 shows modulus for acrylic films containing various polymers. Table 4 shows modulus values for fibers containing different polymers and reinforcing agents.

Polymerizations of polyureas in spinning solutions made of a copolymer of about 93% acrylonitrile and about 7% vinyl acetate dissolved in dimethylacetamide were carried out in accordance with the procedure outlined above for making films. In a four liter mixer, the dried copolymer was dissolved in dried dimethylacetamide at 65° C., the mixer being blanketed with nitrogen. The spinning solution or dope, containing for each of the runs between 10 and 20 weight percent, of the copolymer, was then cooled to 20° C. and the diamine was dissolved using dimethylacetamide to rinse the diamine into the dope, with the diisocyanate then being added. After thirty minutes of stirring, the dope containing the polyurea was heated to 50° C. and then transferred to a spinning pot.

Fiber spinning was under standard conditions. Spinning dopes were spun from a 100 hole spinneret into a spin bath made up of 55 weight percent dimethylacetamide and 45 weight percent water at a temperature of 30° C., the filaments being given a jet stretch of about 0.3 to 0.46. The filaments were then washed in cold water on a first godet at 6 meters per minute, drawn in a boiling water cascade and washed with water at 55° C. on a second godet. A conventional finish was then applied to the fibers and the fibers were dried at 130° C. on another godet to give a fiber having a denier of about 10 dpf. The term "as spun" in Table 4 refers to the fiber at this point.

The hot-wet modulus of the reinforced fibers, which will be at least 1 gram per denier, is higher than the hot-wet modulus of the films represented in Tables 1–3 for the reason that the fibers at this point have been drawn whereas the films have not. Drawing the films would give them about the same hot-wet modulus as the fibers.

Skeins of the fiber were annealed by shrinking them in a steam autoclave in a conventional manner. The skeins, in this process, are subjected to alternating cycles of vacuum and steam under pressure. Seven cycles were used, with the steam pressure being about 205 to 230 newtons per square meter.

For determining hot-wet modulus, the fibers were immersed in water at 93° C. for 1 minute and the modulus was then determined using the procedure give in ASTM 2256-24.

TABLE 1

STORAGE MODULUS OF ACRYLIC FILMS REINFORCED WITH TDI-HMD POLYUREA

| Run | Weight % Polyurea in Film | Dry Dynamic Storage Modulus(DYNE/CM$^2$ × 10$^{10}$) | | | | Wet Dynamic Storage Modulul(DYNE)/ cm$^2$ × 10 ) | | | |
|---|---|---|---|---|---|---|---|---|---|
| | | 30° C. | 93° C. | 120° C. | 150° C. | 30° C. | 60° C. | 80° C. | 93° C. |
| A | 0 | 1.9 | 1.4 | 0.24 | 0.060 | 1.5 | 1.1 | 0.30 | 0.087 |
| B | 19.2 | 1.7 | 1.4 | 0.47 | 0.25 | 1.0 | 0.74 | 0.36 | 0.21 |
| C | 28.4 | 1.6 | 1.3 | 0.55 | 0.27 | 2.3 | 1.8 | 0.58 | 0.34 |
| D | 35.7 | 2.5 | 1.6 | 0.90 | 0.50 | 1.7 | 1.1 | 0.55 | 0.30 |
| E | 44.2 | 1.8 | 1.3 | 0.56 | 0.29 | 2.3 | 1.9 | 1.0 | 0.60 |
| F | 50.0 | * | * | * | * | * | * | * | * |
| G | 100.0 | 1.3 | 1.3 | 1.3 | 1.2 | 1.9 | 1.8 | 1.7 | 1.3 |

*Film was so brittle that mechanical integrity could not be maintained for Vibron measurement

TABLE 2

STORAGE MODULUS OF ACRYLIC FILMS REINFORCED WITH MDI-HMD POLYUREA

| Run | Weight % Polyurea in Film | Dry Dynamic Storage Modulus (DYNE/CM$^2$ × 10$^{10}$) | | | | Wet Dynamic Storage Modulus (DYNE/CM$^2$ × 10$^{10}$) | | | |
|---|---|---|---|---|---|---|---|---|---|
| | | 30° C. | 93° C. | 120° C. | 150° C. | 30° C. | 60° C. | 80° C. | 93° C. |
| H | 0 | 1.9 | 1.4 | 0.13 | 0.060 | 1.5 | 1.1 | 0.30 | 0.087 |
| I | 10.7 | 2.2 | 1.6 | 0.45 | 0.16 | 1.1 | 1.0 | 0.27 | 0.14 |
| J | 16.7 | 2.0 | 1.3 | 0.28 | 0.15 | 2.2 | 1.3 | 0.48 | 0.20 |
| K | 21.8 | 2.0 | 1.5 | 0.60 | 0.17 | 0.95 | 0.80 | 0.26 | 0.16 |
| L | 38.0 | 0.80 | 0.60 | 0.20 | 0.11 | 0.40 | 0.24 | 0.19 | 0.11 |
| M | 50.0 | 0.70 | 0.60 | 0.35 | 0.18 | 0.70 | 0.40 | 0.14 | 0.065 |

TABLE 3

COMPARISON OF STORAGE MODULUS INCREASE FOR VARIOUS REINFORCING POLYMER STRUCTURES IN ACRYLIC FILMS

| Run | Polymer | Weight % Polyurea in Film | Storage Modulus (DYNES/CM$^2$ × 10$^{10}$) | |
|---|---|---|---|---|
| | | | 93° C.-Wet | 150° C.-Dry |
| N | None | 0 | 0.087 | 0.060 |

TABLE 3-continued
COMPARISON OF STORAGE MODULUS INCREASE FOR VARIOUS REINFORCING POLYMER STRUCTURES IN ACRYLIC FILMS

| Run | Polymer | Weight % Polyurea in Film | Storage Modulus (DYNES/CM$^2$ × 10$^{10}$) 93° C.-Wet | 150° C.-Dry |
|---|---|---|---|---|
| O | 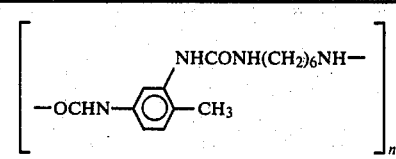 | 19.2<br>28.4 | 0.21<br>0.34 | 0.25<br>0.27 |
| P | 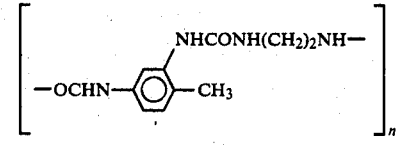 | 28.4 | 0.25 | 0.27 |
| Q | 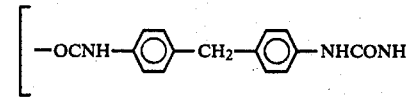 | 16.7<br>21.8 | 0.16<br>0.10 | 0.17<br>0.15 |
| R | 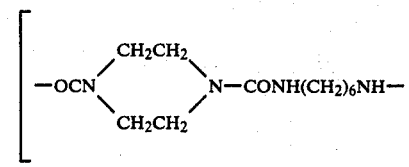 | 16.7 | 0.085 | 0.055 |

TABLE 4

Physical Properties of Acrylic Fibers Containing Polyureas

| Run | Polymer Reinforcement | Weight % in Fiber | Weight % Total Solids In Dope | Cascade Stretch | Plastic Stretch at 170° C. | As Spun Properties Denier (d) Per Filament | (g/d) Tenacity | % Elongation | % Relative Tenacity Retention | Hot-Wet Modulus(g/d) 93° C. H$_2$O |
|---|---|---|---|---|---|---|---|---|---|---|
| S | None | 0 | 25 | 6.0 | — | 10.0 | 3.4 | 16.0 | 22.6 | 1.7 |
| T | ↑ | 20 | 21 | 6.0 | — | 8.7 | 3.4 | 17.7 | 13.9 | 2.3 |
| U | ↑ | 20 | 21 | 6.0 | 1.6 | 9.4 | 4.5 | 9.4 | 10.8 | 2.5 |
| V | * | 20 | 21 | 4.0 | 1.7 | 5.8 | 4.4 | 9.5 | 9.6 | 3.9 |
| W | ↓ | 15 | 21 | 5.5 | — | 9.8 | 3.3 | 17.3 | 9.2 | 3.1 |
| X | ↓ | 20 | 25 | 6.0 | — | 10.3 | 3.4 | 17.9 | 12.7 | 2.5 |
| Y | ↓ | 35 | 21 | 3.0 | — | 9.8 | 1.8 | 19.7 | 13.3 | 2.6 |
| Z | ** | 15 | 21 | 5.0 | — | 9.6 | 2.5 | 16.5 | 10.6 | 1.9 |

| Run | Annealed Denier (d) Per Filament | Tenacity (g/d) | % Elongation | % Relative Tenacity Retention | Hot-Wet Modulus(g/d) 93° C. H$_2$O |
|---|---|---|---|---|---|
| S | 14.2 | 2.3 | 44.0 | 95.5 | 0.5 |
| T | 14.9 | 1.6 | 68.4 | 96.7 | 1.6 |
| U | 11.9 | 2.9 | 37.3 | 60.6 | 2.0 |
| V | 9.3 | 2.4 | 45.4 | 80.5 | 1.5 |
| W | 13.8 | 2.2 | 49.8 | 88.3 | 0.8 |
| X | 15.3 | 2.2 | 64.0 | 95.9 | 1.3 |
| Y | 11.9 | 1.3 | 33.3 | 72.3 | 1.8 |
| Z | 12.4 | 1.8 | 37.7 | 63.7 | 0.5 |

*See Run O
**See Run Q

What is claimed is:

1. An acrylic fiber containing as a discrete phase 5 to 20 weight percent of a polyurea selected from the group consisting of:

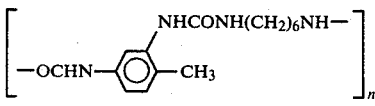

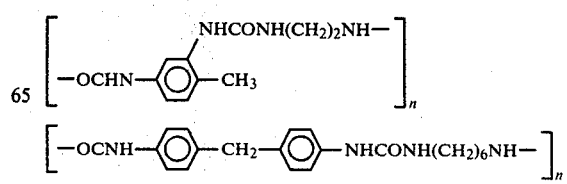

-continued
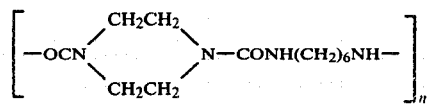
where n is 4 to 300.
2. The fiber of claim 1 wherein the polyurea is
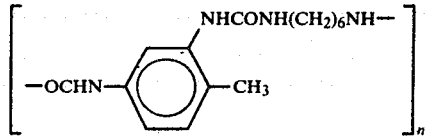
* * * * *